United States Patent
Fritz et al.

(10) Patent No.: US 9,213,510 B1
(45) Date of Patent: Dec. 15, 2015

(54) PRINT SCHEDULING MECHANISM

(71) Applicants: Erik Jason Fritz, Thornton, CO (US); Joseph Paul Gaertner, Lafayette, CO (US); Kumar Kadiyala, Boulder, CO (US); Lance Jones, Lafayette, CO (US); Marcel Stoica, Timisoara (RO)

(72) Inventors: Erik Jason Fritz, Thornton, CO (US); Joseph Paul Gaertner, Lafayette, CO (US); Kumar Kadiyala, Boulder, CO (US); Lance Jones, Lafayette, CO (US); Marcel Stoica, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/304,456

(22) Filed: Jun. 13, 2014

(51) Int. Cl.
*G06F 3/12* (2006.01)

(52) U.S. Cl.
CPC ............ *G06F 3/1262* (2013.01); *G06F 3/1217* (2013.01); *G06F 3/1219* (2013.01); *G06F 3/1264* (2013.01); *G06F 2206/1508* (2013.01)

(58) Field of Classification Search
CPC .................................................... G06F 3/1262
USPC .......................... 358/1.15; 715/255, 764, 769
See application file for complete search history.

(56) References Cited

U.S. PATENT DOCUMENTS

| | | | |
|---|---|---|---|
| 5,528,205 A | 6/1996 | Wong | |
| 5,745,219 A | 4/1998 | DeMarti, Jr. et al. | |
| 5,825,259 A | 10/1998 | Harpham | |
| 6,623,275 B1 | 9/2003 | Pavlovic et al. | |
| 6,805,502 B2 * | 10/2004 | Rai et al. | 400/61 |
| 7,148,767 B2 | 12/2006 | Kobayashi et al. | |
| 7,258,498 B2 | 8/2007 | Hatta et al. | |
| 7,639,386 B1 * | 12/2009 | Siegel et al. | 358/1.18 |
| 7,649,640 B2 * | 1/2010 | Young et al. | 358/1.13 |
| 7,751,079 B2 | 7/2010 | d'Entrecasteaux | |
| 8,059,292 B2 | 11/2011 | Rai | |
| 8,076,990 B2 | 12/2011 | Pischl | |
| 8,149,439 B2 | 4/2012 | Morales | |
| 8,270,007 B2 | 9/2012 | Pandit et al. | |
| 8,325,370 B2 | 12/2012 | Hashimoto | |
| 8,384,927 B2 * | 2/2013 | Harmon et al. | 358/1.15 |
| 8,463,790 B1 * | 6/2013 | Joshi et al. | 707/738 |
| 8,468,527 B2 | 6/2013 | Rai | |
| 8,610,909 B2 | 12/2013 | Miyata | |
| 8,634,731 B2 | 1/2014 | Has et al. | |
| 8,699,064 B2 | 4/2014 | Gaertner et al. | |
| 2002/0163665 A1 * | 11/2002 | Iwata et al. | 358/1.15 |
| 2003/0149747 A1 | 8/2003 | Rai et al. | |
| 2004/0190042 A1 | 9/2004 | Ferlitsch et al. | |
| 2007/0092323 A1 | 4/2007 | Lin et al. | |
| 2007/0229895 A1 * | 10/2007 | Fujimori et al. | 358/1.16 |

(Continued)

FOREIGN PATENT DOCUMENTS

JP          2007295476          11/2007

OTHER PUBLICATIONS

Lucent Technologies, "Installing ferrites and toroids", Available at: https://downloads.avaya.com/elmodocs2/definity/ds9 ip600/2334161/intr5/imferrite.pdf, Nov. 1999, 10 pages.

(Continued)

*Primary Examiner* — Benjamin O Dulaney
(74) *Attorney, Agent, or Firm* — Blakely, Sokoloff, Taylor & Zafman LLP

(57) ABSTRACT

A method disclosed. The method includes receiving a plurality of jobs at a printing environment, collecting a first set of the plurality jobs at a first filter based on one or more job properties, generating a first batch of one or more jobs to be processed from the first set of jobs in the first filter that and displaying the first filter and the first batch at a graphical user interface (GUI).

28 Claims, 6 Drawing Sheets

(56) References Cited

U.S. PATENT DOCUMENTS

| | | |
|---|---|---|
| 2007/0236724 A1 | 10/2007 | Rai et al. |
| 2008/0285068 A1 | 11/2008 | Rai |
| 2009/0021775 A1 | 1/2009 | Rai |
| 2009/0033979 A1* | 2/2009 | Morales et al. ............... 358/1.15 |
| 2009/0122340 A1 | 5/2009 | Nagahama |
| 2009/0241024 A1 | 9/2009 | Shiohara |
| 2010/0091319 A1 | 4/2010 | Mandel |
| 2010/0265536 A1* | 10/2010 | Hiraki ............................ 358/1.15 |
| 2011/0002004 A1* | 1/2011 | Rai et al. ....................... 358/1.15 |
| 2011/0063654 A1* | 3/2011 | Simske et al. ................. 358/1.15 |
| 2011/0211857 A1 | 9/2011 | Mikami |
| 2011/0235093 A1* | 9/2011 | Cain .............................. 358/1.15 |
| 2011/0291789 A1 | 12/2011 | Dalmia et al. |
| 2012/0154849 A1 | 6/2012 | Kurohata |
| 2012/0268785 A1 | 10/2012 | Okada et al. |
| 2012/0327456 A1 | 12/2012 | Chakra |
| 2013/0070285 A1 | 3/2013 | Gross et al. |
| 2013/0070287 A1* | 3/2013 | Atawneh ........................ 358/1.15 |
| 2013/0100483 A1* | 4/2013 | Henry et al. ................... 358/1.15 |
| 2013/0128302 A1* | 5/2013 | Rai et al. ....................... 358/1.15 |
| 2013/0250329 A1 | 9/2013 | Satoh |
| 2014/0368843 A1* | 12/2014 | Hayashi ......................... 358/1.9 |

OTHER PUBLICATIONS

Liard Technologies, "Common mode choke filtering improves CMRR in ethernet transformer applications", Available at: www.lairdtech.com/downloadasset.aspx?id=2147483977, Jun. 2011, 10 pages.

* cited by examiner

Figure 4C

PRINT SCHEDULING MECHANISM

FIELD OF THE INVENTION

The invention relates to the field of computer systems, and in particular, to printing software products.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a workstation and the printer, printing software is implemented at a print server to manage a print job from order entry and management through the complete printing process. The printing software often includes a graphical user interface (GUI) that enables users to control the printing process. In high speed production printing environments, it would be advantageous to provide printing software that features visibility, automation and metrics for the efficient printing and finishing large amounts of orders in order to reduce wastes (e.g., time and paper waste).

Accordingly, a print scheduling mechanism is desired.

SUMMARY

In one embodiment, a method includes receiving a plurality of jobs at a printing environment, collecting a first set of the plurality jobs at a first filter based on one or more job properties, generating a first batch of one or more jobs to be processed from the first set of jobs in the first filter that and displaying the first filter and the first batch at a graphical user interface (GUI).

In other embodiments, a system, computer readable medium and a computer program product may be implemented to perform the method.

BRIEF DESCRIPTION OF THE DRAWINGS

A better understanding of the present invention can be obtained from the following detailed description in conjunction with the following drawings, in which:

FIGS. 4A-4C illustrate screen shots of another embodiment of a graphical user interface.

DETAILED DESCRIPTION

A print scheduling mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
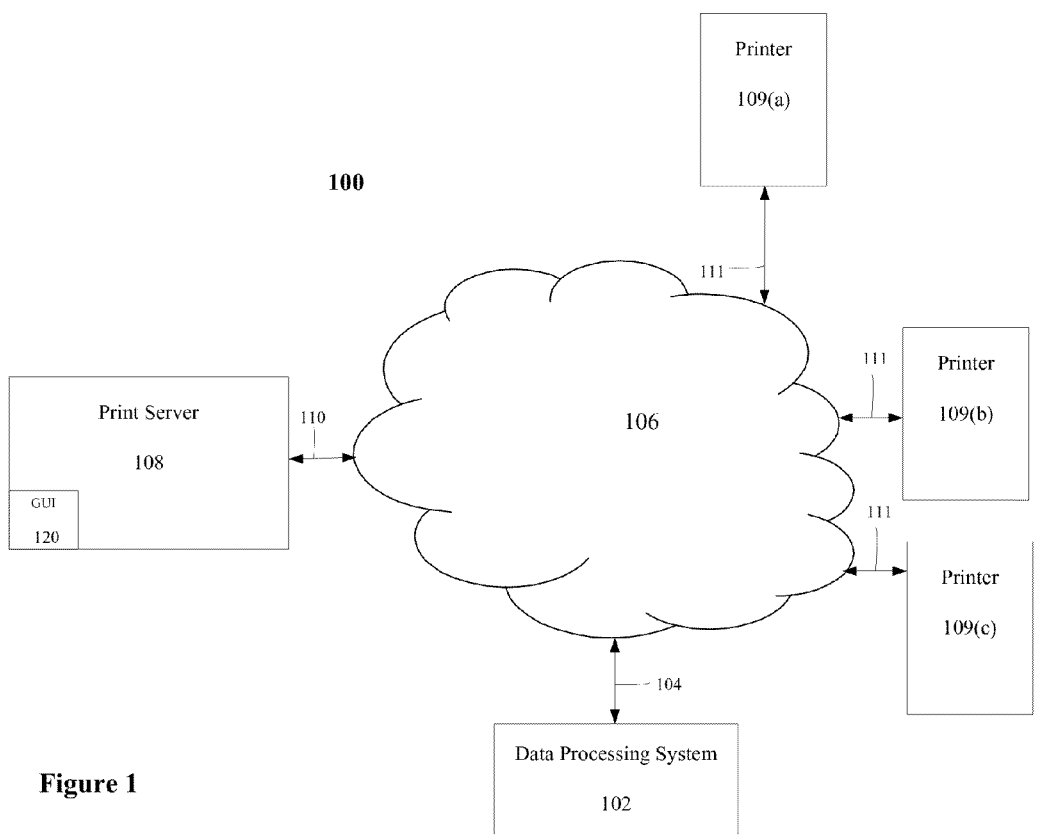
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes print server 108 that serve print requests over network 106 received via communications link 110. Print server 108 subsequently transmits the print requests via communications link 110 to one of printers 109 for printing, which are coupled to network 106 via communications links 111. In one embodiment, an operator at data processing system 102 may interact with print server 108 using a GUI 120 to submit requests for service to one or more of printers 109 over network 106.

Although described as separate entities, other embodiments may include a print server 108 being incorporated in one or more of the printers 109. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the processing (e.g., printing) of documents from data processing system 102 to one or more of printers 109. In other embodiments, the printing software manages printing of documents from multiple data processing systems 102 to printers 109.

According to one embodiment, the printing software product may be implemented using either TotalFlow Print Manager or TotalFlow Production Manager, although other types of printing software may be used instead. In a further embodiment, the print printing software product includes GUI 120 that enables a system administrator (or operator) to interact with the print printing software product at printer servers 108.

According to one embodiment, GUI 120 enables an operator to instantly view all jobs that meet specific job properties based on printing, finishing, paper and operator defined fields. In such an embodiment, a job may be defined as a unit of work (e.g., one or more files) to be processed at printer 109. In a further, embodiment, GUI 120 includes filter and batch views that enables the operator to make decisions on volume metrics that are defined, and create filter scenarios for optimal efficiency. In such an embodiment, filters defined by an operator collect jobs with specific processing options in any order, while batches can be created (either manually or automatically) from these filters of jobs when a defined threshold or volume range is met.

Figure 2:
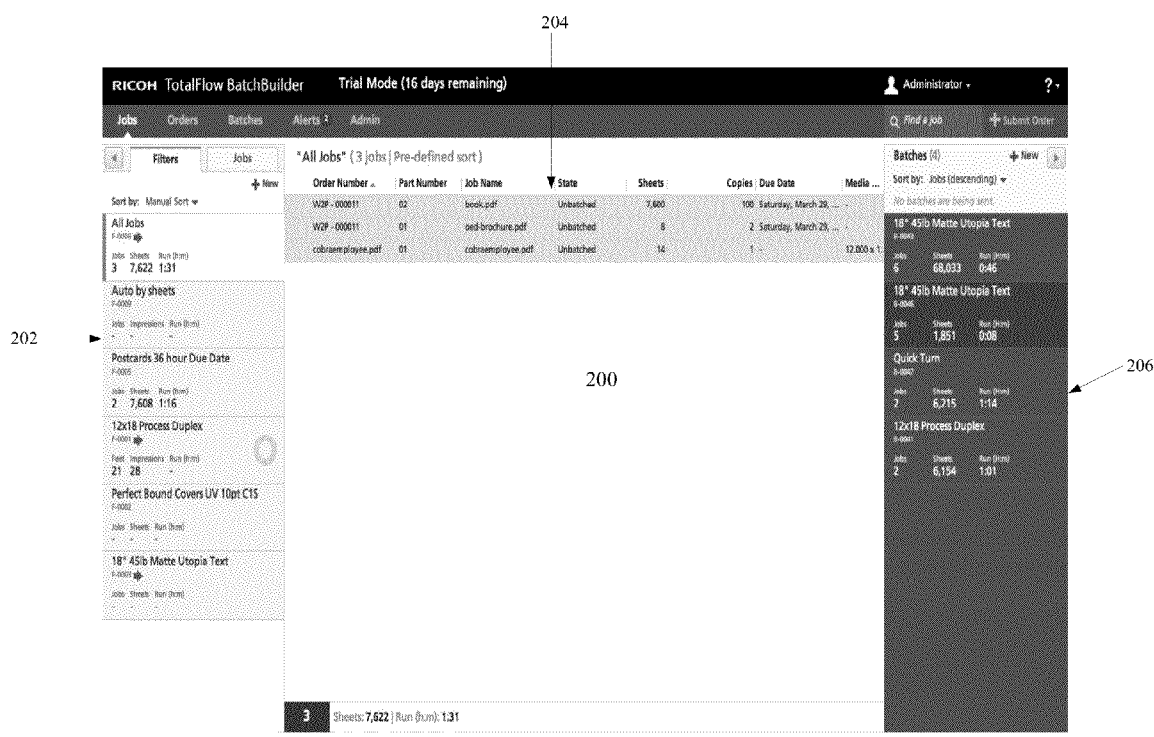
FIG. 2 illustrates a screen shot of one embodiment of a graphical user interface.

FIG. 2 illustrates a screen shot of one embodiment of a GUI window 200. Window 200 enables an operator to view all jobs in matching filters, which enables generation of batches to be forwarded to one or more output devices (e.g., a printer, an imposition hot folder or directory on a network). Window 200 includes a filters area 202, a jobs grid 204 and batching panel 206.

According to one embodiment, filters area 202 provides a view of statistics (e.g., number of sheets, jobs, run time, etc,) of various operator defined filters. Filters area 202 simulates how jobs could be printed, finished or imposed together without altering files, thus providing the operator a choice or scenario of how to optimize the production process. Upon selection, jobs within a filter are displayed in jobs grid 204 along with various corresponding attributes (e.g., job name, sheets, copies, etc.). Based on filters shown in filter area 202, the operator may make decisions based on the results. For instance, the operator may automatically and/or manually batch work. Batched jobs are displayed in batching panel 206.

Figure 3:
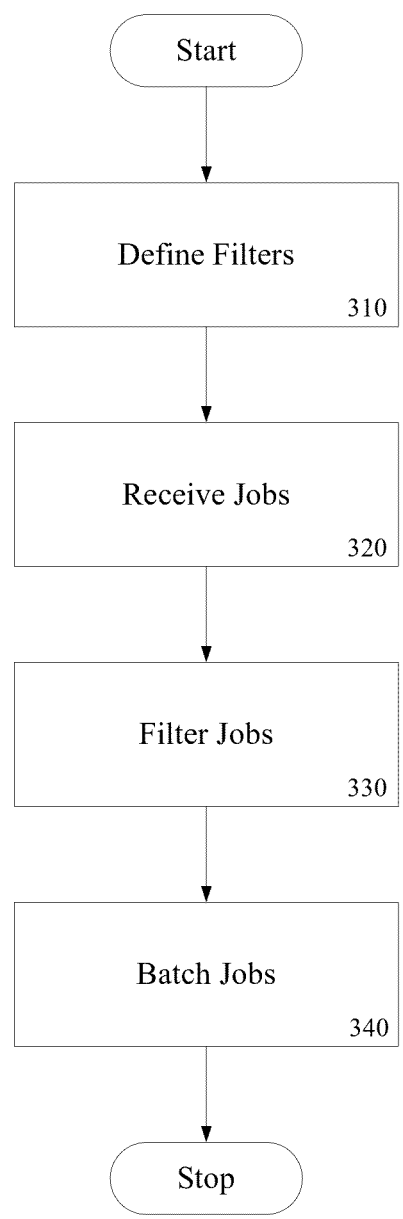
FIG. 3 is a flow diagram illustrating one embodiment for processing work orders.

FIG. 3 is a flow diagram illustrating one embodiment for processing work orders. At processing block 310, filters are defined. According to one embodiment, an operator can define a filter to match one or more job properties (e.g., media attributes, finishing attributes, lamination attributes, binding attributes, custom attributes, etc.). In such an embodiment, operators (e.g., =, !=, >, <, ≤, ≥) may be used for matching.

Figure 4A:
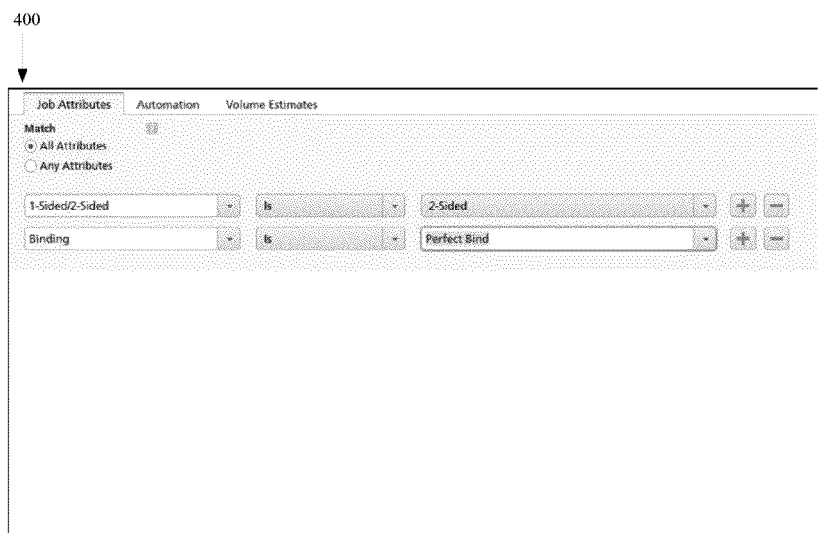
Figure 4B:
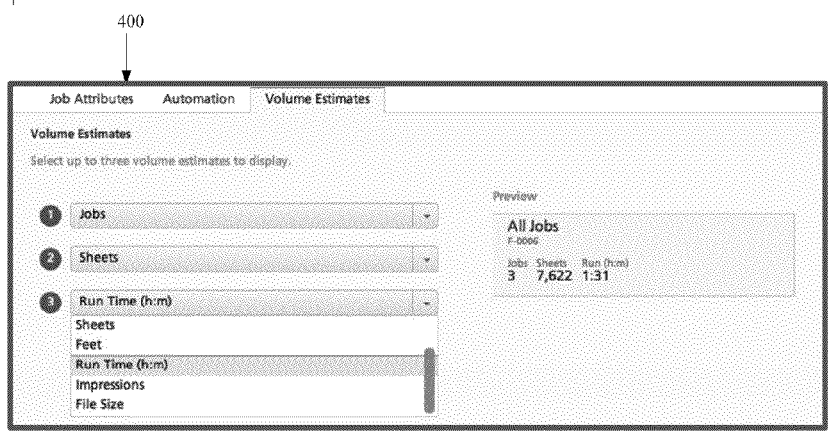

FIG. 4A illustrates a screen shot of one embodiment of a GUI window 400 implemented to define a filter. Window 400 enables filters to be defined based on job attributes, as discussed above, by selecting a job attributes tab. In a further embodiment, operators may configure filters to display and automate using volume estimates, such as job run time, sheets, impressions, file size, etc., by selecting a volume estimates tab. FIG. 4B illustrates a screen shot of such an embodiment of a GUI window 400.

Referring back to FIG. 3, jobs are received after the filters have been defined, processing block 320. At processing block 330, jobs matching the defined filters are collected and displayed at filter area 202. At processing block 340, the jobs may be batched based on job properties. In one embodiment, jobs may be manually batched by an operator selecting various jobs and inserting the jobs into batches. In a further embodiment, such an operation is performed by the operator using an input/output device (e.g., a mouse) to drag and drop selected jobs into the batch.

In another embodiment, batches may be automatically generated upon a defined threshold or volume range being met. In one embodiment, threshold based batch generation occurs at a point of time at which a threshold boundary of jobs having secondary attributes is reached, while volume-based automation features a plus/minus (+/−) range at which batch generation is triggered. As a result, volume-based automation is triggered on the reaching of a range, rather than the surpassing of a threshold. In such an embodiment, the range may indicate any volume exceeding a single quantity that would trigger automation.

Figure 4C:
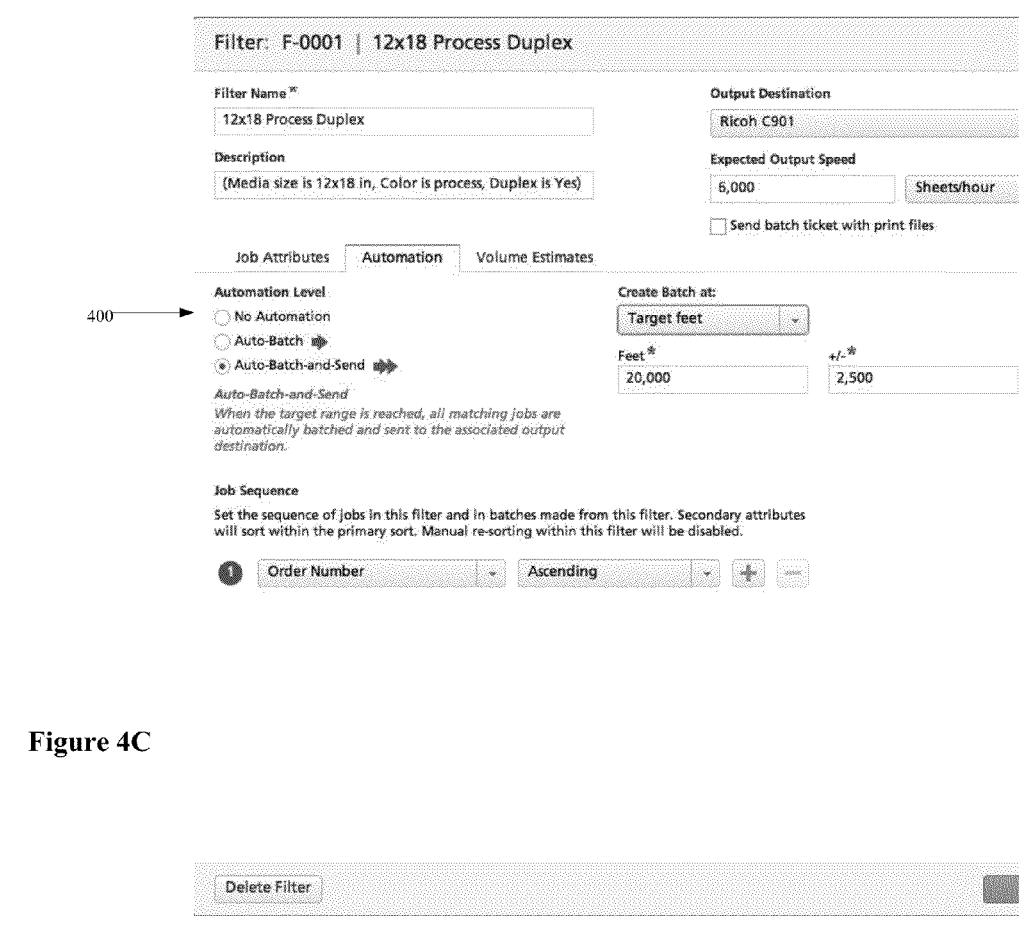

According to one embodiment, window 400 may be implemented to select secondary attributes and corresponding thresholds/volumes. FIG. 4C illustrates a screen shot of one embodiment of GUI window 400 implemented to generate a batch based on volume. As shown in FIG. 4C, selection of an automation tab in window 400 enables batch generation of jobs in a filter and a box to enter a threshold.

Upon selection of the automation tab, automation level options are provided (e.g., No Automation, Auto-Batch, Auto-Batch-and-Send), along with attribute options (e.g., Target feet) for which to perform the batch along with an option to enter corresponding thresholds (Feet). Upon selection of the Auto-Batch option, matching jobs are automatically batched upon reaching the entered threshold (plus/minus an entered amount). Upon selection of Auto-Batch-and-Send option, matching jobs are automatically batched and forwarded to a selected output destination upon reaching the entered threshold.

Figure 5:
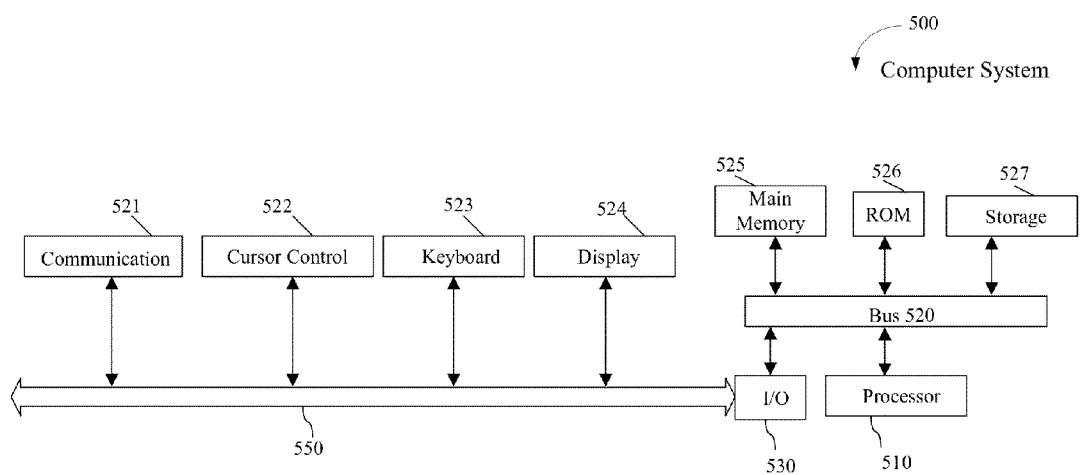
FIG. 5 illustrates one embodiment of a computer system.

FIG. 5 illustrates a computer system 500 on which data processing system 102 and/or servers 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer products, components and/or custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer generated method comprising:
receiving a plurality of jobs at a printing environment;
collecting a first set of the plurality jobs at a first filter based on one or more job properties;
generating a first batch upon automatic selection of one or more jobs from the first set of jobs in the first filter based on a secondary attribute;
displaying the first set of jobs in the first filter at a first location of a graphical user interface (GUI); and
displaying the first batch of jobs at a second location of the GUI, wherein the batch is displayed under a listing of the secondary attribute.

2. The method of claim 1 further comprising defining the first filter, via the GUI, by selecting the one or more job properties.

3. The method of claim 2 wherein selecting the one or more job properties comprises selecting one or more job attributes to be shared by the first set of jobs.

4. The method of claim 3 wherein the one or more job attributes comprise one or more of media attributes, finishing attributes, lamination attributes, binding attributes and custom attributes.

5. The method of claim 2 wherein selecting the one or more job properties comprises selecting a volume estimate to be shared by the first set of jobs.

6. The method of claim 1 wherein the first batch is automatically generated upon a defined threshold of jobs having the secondary attribute being met.

7. The method of claim 6 further comprising automatically transmitting the first batch for processing at an output device after generation.

8. The method of claim 1 wherein the first batch is automatically generated upon a volume being met.

9. The method of claim 1 wherein the first batch is manually generated by using the GUI to select and insert one or more of the first set of jobs from the first filter into the first batch.

10. The method of claim 1 further comprising generating a second batch of one or more jobs from the first set of jobs in the first filter.

11. A non-transitory computer program product stored on a computer readable medium having instructions for implementing the method of claim 1.

12. A print server, comprising:
a processor; and
a printing software product including a graphical user interface (GUI) to be executed by the processor to receive a plurality of jobs at a printing environment, collect a first set of the plurality jobs at a first filter based on one or more job properties, generate a first batch upon automatic selection of one or more jobs from the first set of jobs in the first filter based on a secondary attribute, display the first set of jobs in the first filter at a first location of a graphical user interface (GUI) and display the first batch of jobs at a second location of the GUI, wherein the batch is displayed under a listing of the secondary attribute.

13. The print server of claim 12 wherein the GUI comprises a window to define the first filter by selecting the one or more job properties.

14. The print server of claim 13 wherein selecting the one or more job properties comprises selecting one or more job attributes to be shared by the first set of jobs.

15. The print server of claim 14 wherein the one or more job attributes comprise one or more of media attributes, finishing attributes, lamination attributes, binding attributes and custom attributes.

16. The print server of claim 13 wherein selecting the one or more job properties comprises selecting a volume estimate to be shared by the first set of jobs.

17. The print server of claim 12 wherein the GUI comprises a window to generate the first batch.

18. The print server of claim 17 wherein the window comprises:
a selection to automatically generate the first batch upon a defined threshold being met; and
a box to enter the defined threshold.

19. The print server of claim 18 wherein the window further comprises a selection to automatically generate the first batch and transmit the first batch for processing at an output device upon a defined threshold being met.

20. The print server of claim 17 wherein the window comprises:
a selection to automatically generate the first batch upon a volume range being met; and
a box to enter a defined volume; and
a box to enter a plus/minus range for the defined volume.

21. A non-transitory machine-readable medium including data that, when accessed by a machine, cause the machine to perform operations comprising:
receiving a plurality of jobs at a printing environment;
collecting a first set of the plurality jobs at a first filter based on one or more job properties;
generating a first batch upon automatic selection of one or more jobs from the first set of jobs in the first filter based on a secondary attribute;
displaying the first set of jobs in the first filter at a first location of a graphical user interface (GUI); and
displaying the first batch of jobs at a second location of the GUI, wherein the batch is displayed under a listing of the secondary attribute.

22. The machine-readable medium of claim 21 including data that, when accessed by a machine, cause the machine to perform further operations comprising defining the first filter, via the GUI, by selecting the one or more job properties.

23. The machine-readable medium of claim 22 wherein selecting the one or more job properties comprises selecting one or more job attributes to be shared by the first set of jobs.

24. The machine-readable medium of claim 22 including data that, when accessed by a machine, cause the machine to perform further operations comprising selecting the one or more job properties comprises selecting a volume estimate to be shared by the first set of jobs.

25. The machine-readable medium of claim 21 wherein the first batch is automatically generated upon a defined threshold being met.

26. The machine-readable medium of claim 25 including data that, when accessed by a machine, cause the machine to perform further operations comprising automatically transmitting the first batch for processing at an output device after generation.

27. The machine-readable medium of claim 21 wherein the first batch is manually generated by using the GUI to select and insert one or more of the first set of jobs from the first filter into the first batch.

28. The machine-readable medium of claim 21 further comprising generating a second batch of one or more jobs from the first set of jobs in the first filter.

* * * * *